(12) United States Patent
Roberts et al.

(10) Patent No.: US 7,683,134 B2
(45) Date of Patent: *Mar. 23, 2010

(54) MALEATED HIGH ACID NUMBER HIGH MOLECULAR WEIGHT POLYPROPYLENE OF LOW COLOR

(75) Inventors: Thomas David Roberts, Grapevine, TX (US); Stephen Wayne Coe, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/176,641

(22) Filed: Jul. 21, 2008

(65) Prior Publication Data

US 2008/0281050 A1 Nov. 13, 2008

Related U.S. Application Data

(60) Division of application No. 11/051,376, filed on Feb. 4, 2005, now Pat. No. 7,408,007, which is a continuation-in-part of application No. 09/951,985, filed on Sep. 11, 2001, now abandoned, which is a continuation of application No. 09/498,574, filed on Feb. 4, 2000, now abandoned, which is a continuation of application No. 09/256,830, filed on Feb. 24, 1999, now Pat. No. 6,046,279, which is a division of application No. 08/859,628, filed on May 20, 1997, now Pat. No. 5,955,547, which is a continuation of application No. 08/802,595, filed on Feb. 19, 1997, now abandoned, which is a continuation-in-part of application No. 08/296,208, filed on Aug. 25, 1994, now abandoned.

(51) Int. Cl.
*C08F 255/02* (2006.01)
*C08F 8/46* (2006.01)

(52) U.S. Cl. .................. 525/285; 525/184; 525/284; 525/333.7; 525/387

(58) Field of Classification Search .............. 525/184, 525/284, 285, 333.7, 387
See application file for complete search history.

(56) References Cited

U.S. PATENT DOCUMENTS

| | | | |
|---|---|---|---|
| 3,414,551 A | 12/1968 | Reid et al. |
| 3,480,580 A | 11/1969 | Joyner et al. |
| 3,481,910 A | 12/1969 | Brunson |
| 3,642,722 A | 2/1972 | Knowles et al. |
| 3,862,265 A | 1/1975 | Steinkemp et al. |
| 3,932,368 A | 1/1976 | McConnell et al. |
| 4,003,874 A | 1/1977 | Ide et al. |
| 4,026,967 A | 5/1977 | Flexman, Jr. et al. |
| 4,028,436 A | 6/1977 | Bogan et al. |
| 4,031,062 A | 6/1977 | Shirayama et al. |
| 4,071,494 A | 1/1978 | Gaylord |
| 4,159,287 A | 6/1979 | Ames |
| 4,218,263 A | 8/1980 | Kawabata et al. |
| 4,315,863 A | 2/1982 | Tomoshige et al. |
| 4,347,341 A | 8/1982 | Bartl et al. |
| 4,358,564 A | 11/1982 | Ames |
| 4,370,450 A | 1/1983 | Grigo et al. |
| 4,376,855 A | 3/1983 | Ames |
| 4,404,312 A | 9/1983 | Kokubu et al. |
| 4,506,056 A | 3/1985 | Gaylord |
| 4,548,993 A | 10/1985 | Garagnani et al. |
| 4,599,385 A | 7/1986 | Clayton et al. |
| 4,612,155 A | 9/1986 | Wong et al. |
| 4,613,679 A | 9/1986 | Mainord |
| 4,632,962 A | 12/1986 | Gallucci |
| 4,639,495 A | 1/1987 | Waggoner |
| 4,751,270 A | 6/1988 | Urawa et al. |
| 4,762,890 A | 8/1988 | Strait et al. |
| 4,780,228 A | 10/1988 | Gardiner et al. |
| 4,857,600 A | 8/1989 | Gross et al. |
| 4,927,888 A | 5/1990 | Strait et al. |
| 4,987,190 A | 1/1991 | Keogh |
| 5,001,197 A | 3/1991 | Hendewerk |

(Continued)

FOREIGN PATENT DOCUMENTS

EP 0 370 735 A2 5/1990

(Continued)

OTHER PUBLICATIONS

F. Ide and A. Hosegawa, "Studies on Polymer Blend of Nylon 6 and Polypropylene or Nylon 6 and Polystyrene Using the Reaction of Polymer", J. of Applied Polymer Science, 1974, pp. 963-973, vo. 18, John Wiley & Sons, Inc.

(Continued)

*Primary Examiner*—Ana L Woodward
(74) *Attorney, Agent, or Firm*—Polly C. Owen; Bernard J. Graves, Jr.

(57) ABSTRACT

A process for the manufacture of maleated polypropylenes having an acid number greater than 6, a yellowness index color of no greater than 76, and a number average molecular weight of at least 20,000. The process for making the maleated polypropylenes includes forming a mixture of molten polypropylene and molten maleic anhydride in a reactor, introducing a free radical initiator into the molten mixture to produce a product having maleic anhydride grafted onto the polypropylene, and recovering a high acid number, high molecular weight maleated polypropylene of low color from the reactor.

12 Claims, No Drawings

U.S. PATENT DOCUMENTS

| | | | |
|---|---|---|---|
| 5,021,510 | A | 6/1991 | Vroomans |
| 5,073,590 | A | 12/1991 | Abe et al. |
| 5,091,469 | A | 2/1992 | Miller et al. |
| 5,132,399 | A | 7/1992 | MacDonald et al. |
| 5,728,776 | A | 3/1998 | Takemura et al. |
| 5,955,547 | A | 9/1999 | Roberts et al. |

FOREIGN PATENT DOCUMENTS

| | | | |
|---|---|---|---|
| EP | 0 391 744 | A2 | 10/1990 |
| EP | 0 408 470 | A1 | 1/1991 |
| EP | 0 461 881 | A2 | 12/1991 |
| EP | 0 584 590 | A1 | 3/1994 |

OTHER PUBLICATIONS

J.M.G. Martinez, J. Taranco, O. Laguna, & E.P. Collar, "Modification of Polypropylene by Maleic Anhydride, Study on the Reaction Conditions Using a Batch Process", Intern. Polymer Processing, IX, 1994, pp. 246-251, Hanser Publishers, Munich.

Elf Atochem Product Information, Product Name: Orevac CA 100, 1992.

Material Safety Data Sheet, MSDS No. P579010, issued Oct. 15, 1993, Tradename POLYBOND 3000, Chemical Name: Polypropylene, modified.

Uniroyal Chemical Product Information, POLYBOND 3150 modified Polypropylene, 1993.

Database WPI, Week 9351, Derwent Publications Ltd., London, GB; AN 93-410862 & JP,A,05 310 817 (TOYOBO KK), Nov. 22, 1993 (see abstract).

Material Safety Data Sheet (MSDS), MSDS No. P579015, Issued Oct. 15, 1993, Tradename: POLYBOND 3150, Chemical Name: Polypropylene, modified.

Journal of Applied Polymer Science, "Effect of Compatibilization on the Properties of Polypropylene/Polyamide-66 (75/25 Wt/Wt) Blends", Apr. 11, 1994, pp. 195-206.

Uniroyal Product Information, POLYBOND Modified Polyolefin, Effective Date: Mar. 15, 1995.

Certificate of Analysis, Uniroyal Chemical, Inc., Product Name: POLYBOND 3150, Date of Shipment: Jan. 29, 1996.

Characterization of Physical Properties for POLYBOND 3150 Maleated Polypropylene, Date: Tests performed in Mar. and Apr. 1995, Tradename: POLYBOND 3150.

Characterization of Acid Number for POLYBOND 3150 Maleated Polypropylene, Date: Tests performed after Jan. 29, 1996, Tradename: POLYBOND 3150.

Reactive Extrusion, Plastics Formulating and Compounding, May/Jun. 1996, pp. 33, 35, 36.

Stevens, M. P., "Polymer Chemistry", Addison-Wesley, 1975, pp. 196-202.

Gaylord, N. G., et al., "Journal of Applied Polymer Science", vol. 44, 1992, pp. 1941-1949.

MALEATED HIGH ACID NUMBER HIGH MOLECULAR WEIGHT POLYPROPYLENE OF LOW COLOR

CROSS REFERENCE TO RELATED APPLICATIONS

This application is a divisional of U.S. application Ser. No. 11/051,376 filed on Feb. 4, 2005 now U.S. Pat. No. 7,408,007; which was a continuation-in-part of the earlier filed application having U.S. Ser. No. 09/951,985 filed Sep. 11, 2001, now abandoned; which was a continuation of the application having U.S. Ser. No. 09/498,574 filed Feb. 4, 2000, now abandoned; which was a continuation of the application having U.S. Ser. No. 09/256,830 filed Feb. 24, 1999, now U.S. Pat. No. 6,046,279; which was a divisional of the application having U.S. Ser. No. 08/859,628 filed May 20, 1997, now U.S. Pat. No. 5,955,547; which was a continuation of the application having U.S. Ser. No. 08/802,595 filed Feb. 19, 1997, now abandoned; which was a continuation-in-part of the application having U.S. Ser. No. 08/296,208 filed Aug. 25, 1994, now abandoned; wherein this application claims benefit to these earlier filed applications, the entire disclosures of which are incorporated herein by reference.

BACKGROUND OF THE INVENTION

1. Field of the Invention

This invention relates to novel lower color, maleated polypropylenes with higher acid numbers and higher molecular weights. This invention also relates to a novel polypropylene maleation process utilizing low flow rate polypropylenes involving specified ratios of polypropylene, maleic anhydride, and free radical initiator.

2. Background of the Invention

Grafting of monomers onto polyolefins is well known (see 'Polymer Chemistry' by M. P. Stevens, (Addison-Wesley), 1975, pp. 196-202). Maleation is a type of grafting wherein maleic anhydride is grafted onto the backbone chain of a polymer. Maleation of polyolefins falls into at least three subgroups: maleation of polyethylene, maleation of polypropylene, and maleation of copolymers of propylene and ethylene or other monomers.

Maleation of polyethylene provides higher molecular weight products with a noticeable decrease in melt index due to cross-linking, unless special provisions are made, (see for example "Journal of Applied Polymer Science", 44, 1941, N. G. Gaylord et al (1992); and U.S. Pat. Nos. 4,026,967; 4,028,436; 4,031,062; 4,071,494; 4,218,263; 4,315,863; 4,347,341; 4,358,564; 4,376,855; 4,506,056; 4,632,962; 4,780,228; 4,987,190; and 5,021,510). Maleation of polypropylene follows an opposite trend and yields lower molecular weight products with a sharp increase in flow rate due to fragmentation during the maleation process (see for example U.S. Pat. Nos. 3,414,551; 3,480,580; 3,481,910; 3,642,722; 3,862,265; 3,932,368; 4,003,874; 4,548,993; and 4,613,679). Some references in the literature fail to note the difference between maleation of polyethylene and polypropylene, and claim maleation of polyolefins with conditions which are useful only for either polyethylene or polypropylene, respectively. In general, conditions which maleate polypropylene are not ideal for maleation of polyethylene due to the opposite nature of the respective maleation chemistries: fragmentation to lower molecular weights for polypropylene and cross-linking to higher molecular weights for polyethylene. This is shown in U.S. Pat. No. 4,404,312. Maleation of copolymers of propylene and ethylene or other monomers follow the pattern of the majority component.

Maleations of polypropylene can also be further subdivided into batch or continuous processes. In batch processes all of the reactants and products are maintained in the reaction for the entire batch preparation time. In general, batch maleation processes cannot be used competitively in commerce due to high cost. Batch processes are inherently more expensive due to startup and cleanup costs.

The maleated polypropylenes that are reported in the previous literature can also be divided into two product types as a function of whether or not solvent is involved, either as a solvent during reaction or in workup of the maleated products. In U.S. Pat. Nos. 3,414,551; 4,506,056; and 5,001,197 the workup of the product involved dissolving the maleated polypropylene product in a solvent followed by precipitation, or washing with a solvent. This treatment removes soluble components and thus varies both the 'apparent' molecular weight and the acid number. Processes using an extruder produce a product in which solvent soluble components remain. In addition, extruder processes often incorporate a vacuum system during the latter stages of the process to remove volatile lower molecular weight components. Thus different compositions are necessarily present in products produced in an extruder in contrast to those products from solvent processes or those which use a solvent in product workup.

Another subdivision of maleation of polyolefins concerns the state of the reaction process. Solvent processes, or processes where solvent is added to swell the polypropylene (see U.S. Pat. No. 4,370,450) are often carried out at lower temperatures than molten polyolefin (solvent free) processes. Such processes involve surface maleation only, with substantial amounts of polypropylene below the surface being maleation free. Processes using molten polypropylene involve random maleation of all of the polypropylene. Solvent processes are also more expensive in that solvent recovery/purification is necessary. Solvent purification is even more expensive if the process inherently produces volatile by-products, as in maleation. Note that if water is the "solvent", polypropylene is not soluble and reaction must occur only on the surface of the polypropylene solid phase. Further, in aqueous processes maleic anhydride reacts with the water to become maleic acid. In these two ways processes containing water are necessarily different from non-aqueous processes. In a molten process no solvent or water remains at the end of the process to be purified or re-used. Thus a molten process would be environmentally "greener" and less expensive.

Present commercial maleation of low flow rate (high molecular weight) polypropylene by continuous processes, such as in an extruder, produce products with acid numbers well below 4. These products are used in adhesives, sealants, and coatings and as couplers and compatibilizers in polymer blends. However, due to the low acid numbers, the adhesion and coupling properties of these maleated polypropylenes are limited. As noted above, attempts to produce higher acid number polypropylene in continuous processes yield higher colored products with much lower molecular weight with maleic anhydride conversion efficiencies of 20-30% or lower (see for example U.S. Pat. No. 5,001,197). Attempts to produce higher acid number polyethylene in continuous processes yield cross-linking, higher color, and gels (see for example U.S. Pat. Nos. 4,612,155; 4,639,495; 4,751,270; 4,762,890; 4,857,600; and 4,927,888). The patent literature does describe continuous maleation of high flow rate (low molecular weight) polypropylene waxes to higher acid numbers. However, as noted above the molecular weights of the maleated waxes so produced are even lower than that of the starting material due to fragmentations during maleation.

In light of the above, it would be very desirable to maleate lower flow rate polypropylenes in a continuous process to higher molecular weights and higher acid numbers with lower colors than have been known before. It would also be very desirable to maleate these polypropylenes at higher efficiencies.

BRIEF SUMMARY OF THE INVENTION

The composition according to the present invention comprises a maleated polypropylene having an acid number greater than 4.5, a yellowness index color of no greater than 76, and a number average molecular weight of at least 20,000.

The process for the production of high acid number high molecular weight maleated polypropylene of low color comprises forming a mixture of molten polypropylene and molten maleic anhydride, introducing a free radical initiator into the mixture of molten polypropylene and molten maleic anhydride, and recovering high acid number high molecular weight maleated polypropylene of low color, wherein the weight ratio of polypropylene to maleic anhydride is about 10 to 200, the molar ratio of polypropylene to free radical initiator is about 200 to 4,000, and the molar ratio of maleic anhydride to peroxide is about 1 to 70, and wherein the melt flow rate of said molten polypropylene is preferably about 0.1 to 50 at 230° C.

DETAILED DESCRIPTION

The applicants have unexpectedly discovered a novel continuous process to maleate low flow rate polypropylenes. The compositions so formed are novel in that the color is lower, the acid number is higher, and the molecular weight is higher than previously known. The process is also unique in that the efficient use of maleic anhydride is generally much higher than expected.

The composition according to the present invention has an acid number greater than about 4.5. The maleated polypropylene composition according to the present invention preferably has an acid number greater than 5, more preferably between 6 and 70, with an acid number between 9 and 60 being most preferred. Generally, at the higher acid numbers the resulting maleated polypropylene exhibits higher adhesiveness to polar substrates and thus is more useful in combination with materials used in adhesives and sealants. Additionally, at the higher acid numbers the maleated polypropylene is useful as a compatibilizing agent or coupler when used in blends of dissimilar materials, including polymer blends such as a nylon and polypropylene blend. At higher acid numbers lower amounts of maleated polypropylene is needed for any of these purposes. However, due to practicality acid numbers generally above 70 are difficult to produce economically. Thus, practical preferred limits on acid numbers of the maleated polypropylene are below 70.

The composition according to the present invention has a yellowness index color no greater than 76 or about 75. The yellowness index color analysis is illustrated in the examples. At a yellowness index color less than about 75, the resulting maleated polypropylene has a desirable color in that when blended with other materials it imparts less of an undesirable yellow tint or brown tint to the final product. Thus, yellowness index colors well below 75 are more preferred. The maleated polypropylene composition according to the present invention preferably has a yellowness index color less than about 65 or 60, more preferably less than 50 with a yellowness index color less than 40 being most preferred.

The composition according to the present invention has a number average molecular weight of at least 20,000. This number average molecular weight is preferably as high as possible. At higher number average molecular weights the resulting maleated polypropylene is more durable and flexible which is desired in many applications. Thus, the maleated polypropylene preferably has a number average molecular weight greater than 25,000 and even greater than 30,000. However, the maleated polypropylene generally has a number average molecular weight less than 100,000 due to fragmentation that occurs during the process of maleating the molten polypropylene. Therefore, the maleated polypropylene generally has a number average molecular weight for the more preferred compositions between 25,000 and 80,000 with a number average molecular weight between 30,000 and 70,000 being most preferred.

The composition according to the present invention is made from polypropylene that contains less than 20 weight percent of a comonomer and is preferably a homopolypropylene containing less than 5 weight percent of a comonomer, more preferably less than 2 weight percent of a comonomer. At amounts of comonomer higher than 20 weight percent, and sometimes higher than 5 weight percent, the crystallinity of the maleated polypropylene is significantly reduced, and in the case of ethylene as comonomer crosslinking can occur.

The composition according to the present invention can be blended with many other materials to serve as a compatibilizer, such as in blends with nylon and polypropylene. This type of blend preferably contains about 10 to 90 weight percent nylon, about 10 to 90 weight percent polypropylene, and about 0.1 to 10 weight percent maleated polypropylene, more preferably about 25 to 75 weight percent nylon, about 25 to 75 weight percent polypropylene, and about 0.1 to 10 weight percent maleated polypropylene.

Additionally, the maleated polypropylene composition of the present invention can be extended with many components such as wood flour, glass fibers, talc, and mica. The use of these components extend the material reducing the final cost.

The process according to the present invention for producing the high acid number high molecular weight maleated polypropylene of low color preferably includes the use of an extruder as a reactor, the process comprises (a) forming a mixture of molten polypropylene and molten maleic anhydride at one end of a reactor, wherein the melt flow rate of said polypropylene is preferably about 0.1 to 50 at 230° C., (b) mixing a free radical reaction initiator into the mixture of molten polypropylene and molten maleic anhydride to produce a maleated polypropylene, and (c) removing the maleated polypropylene product from the reactor, wherein the weight ratio of polypropylene to maleic anhydride is about 10 to 200, the molar ratio of polypropylene to free radical initiator is about 200 to 4,000, and the molar ratio of maleic anhydride to free radical initiator is about 1 to 70. In a preferred embodiment, the maleated polypropylene product, while still in the extruder, is subjected to a vacuum to remove a substantial portion of volatiles present in the product, and preferably greater than about 80% of the volatiles are removed. The amount of vacuum that the product is subject to can be slightly less than atmospheric, i.e., from about 10 to less than 100 mm of mercury (Hg) to a vacuum of greater than about 300 mm of (Hg) and preferably greater than about 700 mm of Hg.

The process according to the present invention maleates a molten polypropylene that preferably has a melt flow rate of about 0.1 to 50 at 230° C. For all practical purposes, a polypropylene with a melt flow rate below 0.1 is difficult to produce and requires significant torque in a twin screw extruder to be able to process. Whereas, a polypropylene with a melt flow rate greater than 50 to 230° C. yields a maleated polypropylene product with a molecular weight that is lower than is generally useful according to the present invention. The melt flow rate of the polypropylene used to produce a maleated polypropylene of the present invention is more preferably about 0.1 to 40 at 230° C., with a melt flow rate of about 0.1 to 20 at 230° C. being most preferred.

The process according to the present invention uses a free radical initiator to initiate the grafting of the maleic anhydride onto the molten polypropylene. Any free radical source could be useful in the process of the present invention. However, peroxides are generally more preferred due to availability and cost. Peroxides with short half lives i.e. less than 3 seconds at 180° C. are less desirable, since a significantly higher amount of peroxide is needed and results in a maleated polypropylene product of poor color and higher cost. The preferred peroxides are alkyl peroxides, more preferable dialkyl peroxides. Examples of suitable peroxides useful in the process of the present invention include ditertiary butyl peroxide, tertiary butyl hydroperoxide, cumene hydroperoxide, p-menthane peroxide, p-menthane hydroperoxide and 2,5-dimenthyl-2,5-bis-(t-butylperoxy) hexane with ditertiary butyl peroxide and 2,5-bis-(t-butylperoxy) hexane being most preferred.

The process according to the present invention is conducted in a continuous process. Any continuous process can be used in the practice of the present invention. However, stirred pot reactors with powerful stirring mechanisms or screw extruders are favored, with screw extruders generally being more preferred due to the ease in operation and acceptability in manufacturing processes. Twin-screw extruders are the most preferred screw extruders due to their ease of use and efficient mixing action. Screw extruders are also more preferred in that the polypropylene is maleated continuously with a shorter residence time in the reaction zones. The use of a screw extruder in the process of the present invention aids in the production of maleated polypropylenes of improved color and higher molecular weight due in part to less fragmentation of the polypropylene.

The process according to the present invention is preferably conducted at a weight ratio of polypropylene to maleic anhydride between 10 and 200, more preferably between 15 and 120, even more preferably between 20 and 100, with a weight ratio of polypropylene to maleic anhydride of about 20 to 60 being most preferred. At amounts of polypropylene/maleic anhydride below the ratio of 10 too much maleic anhydride is present and the efficiencies are dramatically reduced. Whereas, at ratios above 200 the amount of maleation in the final maleated polypropylene is significantly lower. Such ratios simply increases the need for longer residence time or recycle of low acid number maleated polypropylene.

The residence time of the polypropylene in the continuous reactor depends upon the pumping rate of the polypropylene and the size (volume) of the reactor. This time is generally longer than three times the half life of the free radical initiator so that a second pass through the reactor is not needed to obtain sufficient maleation of the polypropylene. In a stirred reactor the residence time generally varies from about 5 minutes to 1 hour, more preferably about 10 minutes to 30 minutes. In a screw extruder this time generally varies from about 1 to 3 minutes at RPMs of 50 to 400 for a single screw and about 0.45 to 2.5 minutes with twin screws, more preferably about 1 to 2 minutes at RPMs of 150 to 300 with twin screws. As shown in the examples, at certain set amounts of reactants (within the general ratios of reactants required in the present invention) a polypropylene of lower than desired acid number is produced. In this instance the RPM in a screw extruder can be reduced or the residence time increased such that the acid number is increased to be within the more desired acid number limits. Although not shown, a three dimensional plot of maleic anhydride, peroxide and extruder RPM generates a well defined volume from which one skilled in the art would be able to optimize a maleated polypropylene in accordance with the present invention.

The molar ratio of polypropylene to free radical initiator used in the maleation process according to the present invention is preferably about 200 to 4,000, more preferably about 210 to 3,500, with a molar ratio of polypropylene to free radical initiator of about 270 to 2,100 being most preferred. At amounts below the molar ratio of 200 the presence of high amounts of free radical initiator produces excess fragmentation of the polypropylene resulting in a lower molecular weight polypropylene. At amounts above the molar ratio of 4,000 the free radical initiator is at such a low concentration that efficient maleation is not obtainable.

The process according to the present invention is preferably conducted at a molar ratio of maleic anhydride to free radical initiator between about 1 and 70, more preferably between about 2 and 60, even more preferably between about 3 and 50, with a molar ratio of maleic anhydride to free radical initiator of about 3.5 to 15 being most preferred. At molar ratios below 1 the amount of free radical initiator is significantly higher than required for the particular amount of maleation on the polypropylene, and thus increases fragmentation while not significantly increasing the acid number of the maleated polypropylene. For amounts such that the molar ratio of maleic anhydride to free radical initiator is above 70, the efficiencies of the grafting of maleic anhydride onto the polypropylene is dramatically reduced and the color of the resulting product is inferior.

The maleic anhydride useful for the present process is any commercial grade of maleic anhydride. Those with maleic anhydride contents of 95-100% are preferred in that fewer volatile by-products must be handled by the vacuum system. Molten maleic anhydride with a purity over 99% is most preferred for the same reason, fewer volatiles are produced to be handled by the vacuum system.

The process according to the present invention is generally conducted at a temperature above the melting point of the polypropylene. This temperature is preferably between 160 and 220° C., more preferably between 180 and 210° C., with a temperature between 190 and 205° C. being most preferred. At temperatures much below 160 the viscosity of the molten polypropylene is too high to be efficiently pumped through the screw extruder. At temperatures much above 220° C. the fragmentation of the molten polypropylene dramatically increases and molecular weight decreases.

The process according to the present invention is generally conducted such that a vacuum is used at or after step (c) to remove volatiles from the maleated polypropylene product.

The process according to the present invention is generally efficient, grafting onto polypropylene a high percent of the maleic anhydride present during the reaction, thus producing a maleated polypropylene with grafted maleic anhydride at a preferred efficiency percent above 35. This percent maleic anhydride incorporated into polypropylene can be up to or near 100 percent. However, this efficiency rate is generally over about 40 and up to 93 percent, more preferably at least 49 percent. At efficiency rates below 35 percent, maleic anhydride recovery is increased and cost per unit maleation onto the polypropylene is also increased. However, efficiencies at or below 85 percent are generally acceptable.

The following examples are intended to illustrate the present invention but should not be interpreted as a limitation upon the reasonable scope thereof.

EXAMPLES

Values of the acid number as shown in Table 1 are the average of at least 4 determinations taken on samples obtained at 15 minute intervals during an hour of production. An acid number is defined as the number of milligram of KOH which are required to neutralize one gram of sample. Acid numbers were obtained by titrating weighed samples dissolved in refluxing xylene with methanolic potassium hydroxide using phenolphthalein as an indicator. End points were taken when the pink color of the indicator remained 10 seconds.

Color was measured as 'yellowness index' according to ASTM Recommended Practice E 308 for Spectrophotometry and Description of color in CIE 1931 System.

Efficiencies, noted in Table 1 as '% maleic anhydride (MA) used', were calculated based on the percent of the fed MA which was incorporated into the product. (Efficiency of '% MS used' is defined as the pounds of MA grafted into the polymer divided by the pounds of MA pumped into the extruder multiplied by 100.)

The amount of unreacted maleic anhydride remaining in the samples was found to be negligible by using a method based on extraction and hydrolysis. A 1 gram sample was heated with 10 ml of methylene chloride and 10 ml. of water at 125° C. in a pressure vessel for 1 hour and cooled to room temperature. One ml of the clear, top aqueous layer was then diluted to 10 ml with water and analyzed for U. V. absorption at 208 nm. A calibrated graph of absorbance vs. percent MA from known samples facilitated determination of '% free MA', or the amount of unreacted MA expressed as weight percent. Values ranged from 0.1 to 0.4 wt-%.

Molecular weights were obtained by using a Waters 150° C. Gel Permeation Chromatograph with three Waters HT columns (10,000; 100,000; and 1,000,000 angstroms) at 140° C. The calibration standard was polypropylene (Mw=108,000; Mn=32,500). Samples were dissolved in o-di-chlorobenzene at 140° C.

In order to calculate the moles of polypropylene for the ratio of polypropylene/peroxide (moles/moles) the weight of polypropylene was divided by 42, the molecular weight of propylene.

Example 1

Pellets of polypropylene from Eastman Chemical Company as TENITE P4-026 with a melt flow rate of 1.2 were fed into the inlet hopper of a 90 mm twin screw extruder having 13 consecutive equivalent barrels all at 200° C. at 150 rpm at a rate of 272 kg per hour. Molten maleic anhydride at 90° C. was pumped into port 1 on barrel 1 adjacent to the inlet hopper at a rate of 10.9 kg per hour. LUPERSOL 101 [2,5-dimethyl-2,5-bis-(t-butylperoxy) hexane] from Elf Atochem at 1.1 kg per hour was pumped into port 2 on barrel 2. A vacuum, 30 inches of Mercury, (760 mm) was pulled on port 8 and 10 located on barrels 8 and 10. The pale yellow product was extruded as molten strands from barrel 13, was solidified under water, and was then cut into pellets. The product was analyzed with the following results: acid number=8.7; number average molecular weight (Mn)=48,000; weight average molecular weight (Mw)=119,000; yellowness index color=51; and percent maleic anhydride utilized=37% (37% efficiency).

Example 2

This example was carried out essentially as in Example 1 except that the RPM was changed to 292. The maleated polypropylene produced was analyzed with the following results: acid number=10.1; Mn=43,000; Mw=105,000; yellowness index color=49; and maleic anhydride used=43% (43% efficiency).

Example 3

This example was carried out essentially as in Example 2 except that the amount of LUPERSOL 101 was changed to 2.4 kg per hour. The maleated polypropylene produced was analyzed with the following results: acid number=16.4; Mn=30,000; Mw=72,000; yellowness index color-48; and maleic anhydride used=70% (70% efficiency).

Example 4

This example was carried out essentially as in Example 3 except that the RPM was changed to 150. The maleated polypropylene produced was analyzed with the following results: acid number=14.6; Mn=31,000; Mw=87,000; yellowness index color=56; and maleic anhydride used=62% (62% efficiency).

Example 5

This example was carried out essentially as in Example 4 except that the LUPERSOL 101 was changed to 0.5 kg per hour and the maleic anhydride was changed to 4.5 kg per hour. The maleated polypropylene produced was analyzed with the following results: acid number=5.9; Mn=47,000; Mw=118,000; yellowness index color=25; and maleic anhydride used=60% (60% efficiency).

Example 6

This example was carried out essentially as in Example 5 except that the LUPERSOL 101 was changed to 1.1 kg per hour. The maleated polypropylene produced was analyzed with the following results: acid number=9.1; Mn=36,000; Mw=89,000; yellowness index color=24; and maleic anhydride used=93% (93% efficiency).

Example 7

This example was carried out essentially as in Example 6 except that the RPM was changed to 292. The maleated polypropylene produced was analyzed with the following results: acid number=4.8; Mn=51,000; Mw=130,000; yellowness index color=33; and maleic anhydride used=49% (49% efficiency).

Example 8

This example was carried out essentially as in Example 7 except that the LUPERSOL 101 was changed to 0.5 kg per hour. The maleated polypropylene produced was analyzed with the following results: acid number=3.0; Mn=57,000;

Mw=148,000; yellowness index color=32; and maleic anhydride used=31% (31% efficiency).

Example 9

This example was carried out essentially as in Example 8 except that the LUPERSOL 101 was changed to 0.3 kg per hour. The maleated polypropylene produced was analyzed with the following results: acid number=1.8; Mn=65,000; Mw=165,000; yellowness index color=33; and maleic anhydride used=18% (18% efficiency).

Example 10

This example was carried out essentially as in Example 9 except that the RPM was changed to 150. The maleated polypropylene produced was analyzed with the following results: acid number=3.5; Mn=58,000; Mw=145,000; yellowness index color=23; and maleic anhydride used=36% (36% efficiency).

Example 11

This example was carried out essentially as in Example 10 except that the maleic anhydride was changed to 10.9 kg per hour. The maleated polypropylene produced was analyzed with the following results: acid number=5.5; Mn=64,000; Mw=168,000; yellowness index color=36; and maleic anhydride used=23% (23% efficiency).

Example 12

This example was carried out essentially as in Example 11 except that the RPM was changed to 292. The maleated polypropylene produced was analyzed with the following results: acid number=3.6; Mn=60,000; Mw=150,000; yellowness index color=47; and maleic anhydride used=15% (15% efficiency).

Example 13

This example was carried out essentially as in Example 12 except that the LUPERSOL 101 was changed to 0.5 kg per hour. The maleated polypropylene produced was analyzed with the following results: acid number=6.0; Mn=63,000; Mw=135,000; yellowness index color=44; and maleic anhydride used=26% (26% efficiency).

Example 14

This example was carried out essentially as in Example 1 except that the RPM was changed to 200 and the maleic anhydride was changed to 16.3. The maleated polypropylene produced was analyzed with the following results: acid number=5.4; Mn=60,000; Mw=143,000; yellowness index color=64; and maleic anhydride used=15% (15% efficiency).

Example 15

This example was carried out essentially as in Example 14 except that the RPM was changed to 292. The maleated polypropylene produced was analyzed with the following results: acid number=4.2; Mn=71,000; Mw=190,000; yellowness index color=63; and maleic anhydride used=12% (12% efficiency).

Example 16

This example was carried out essentially as in Example 15 except that the maleic anhydride was 21.8 kg per hour. The maleated polypropylene produced was analyzed with the following results: acid number=3.7; Mn=68,000; Mw=192,000; yellowness index color=76; and maleic anhydride used=8% (8% efficiency).

Example 17

This example was carried out essentially as in Example 16 except that the LUPERSOL 101 was changed to 4.5 kg per hour. The maleated polypropylene produced was analyzed with the following results: acid number=9.0; Mn=67,000; Mw=177,000; yellowness index color=75; and maleic anhydride used=19% (19% efficiency).

Example 18

This example was carried out essentially as in Example 17 except that the maleic anhydride was 16.3 kg per hour. The maleated polypropylene produced was analyzed with the following results: acid number=12.0; Mn=54,000; Mw=129,000; yellowness index color=70; and maleic anhydride used=34% (34% efficiency).

Example 19

This example was carried out essentially as in Example 2 except that the LUPERSOL 101 was changed to 3.4 kg per hour. The maleated polypropylene produced was analyzed with the following results: acid number=16.9; Mn=34,000; Mw=82,000; yellowness index color=50; and maleic anhydride used=72% (72% efficiency).

Example 20

This example was carried out essentially as in Example 15 except that the LUPERSOL 101 was changed to 0.5 kg per hour. The maleated polypropylene produced was analyzed with the following results: acid number=4.0; Mn=62,000; Mw=159,000; yellowness index color=58; and maleic anhydride used=11% (11% efficiency).

Example 21

This example was carried out essentially as in Example 9 except that the maleic anhydride was changed to 2.3 kg per hour. The maleated polypropylene produced was analyzed with the following results: acid number=2.4; Mn=65,000; Mw=152,000; yellowness index color=20; and maleic anhydride used=49% (49% efficiency).

Example 22

This example was carried out essentially as in Example 21 except that the RPM was changed to 150. The maleated polypropylene produced was analyzed with the following results: acid number=4.4; Mn=53,000; Mw=124,000; yellowness index color=23; and maleic anhydride used=90% (90% efficiency).

The above examples are summarized below in Table 1 below along with the three important ratios.

TABLE I

| # | RPM | Reagents Perox kg/hr | MA kg/hr | kg MA Used | % MA Used | Product Properties Acid # | Mn, k | Mw, k | Index Color | Reagent Ratios PP/MA kg/kg | PP/Perox mole/mole | MA/perox mole/mole |
|---|---|---|---|---|---|---|---|---|---|---|---|---|
| 1 | 150 | 1.1 | 10.9 | 4.0 | 37 | 8.7 | 48 | 119 | 51 | 25 | 1710.0 | 29.4 |
| 2 | 292 | 1.1 | 10.9 | 4.7 | 43 | 10.1 | 43 | 105 | 49 | 25 | 1710.0 | 29.4 |
| 3 | 292 | 2.4 | 10.9 | 7.6 | 70 | 16.4 | 30 | 72 | 48 | 25 | 783.8 | 13.5 |
| 4 | 150 | 2.4 | 10.9 | 6.7 | 62 | 14.6 | 31 | 87 | 56 | 25 | 783.8 | 13.5 |
| 5 | 150 | 0.5 | 4.5 | 2.7 | 60 | 5.9 | 47 | 118 | 25 | 60 | 3762.0 | 26.7 |
| 6 | 150 | 1.1 | 4.5 | 4.2 | 93 | 9.1 | 36 | 89 | 24 | 60 | 1710.0 | 12.1 |
| 7 | 292 | 1.1 | 4.5 | 2.2 | 49 | 4.8 | 51 | 130 | 33 | 60 | 1710.0 | 12.1 |
| 8 | 292 | 0.5 | 4.5 | 1.4 | 31 | 3.0 | 57 | 148 | 32 | 60 | 3762.0 | 26.7 |
| 9 | 292 | 0.3 | 4.5 | 0.8 | 18 | 1.8 | 65 | 165 | 33 | 60 | 6270.0 | 44.4 |
| 10 | 150 | 0.3 | 4.5 | 1.6 | 36 | 3.5 | 58 | 145 | 23 | 60 | 6270.0 | 44.4 |
| 11 | 150 | 0.3 | 10.9 | 2.5 | 23 | 5.5 | 64 | 168 | 36 | 25 | 6270.0 | 107.6 |
| 12 | 292 | 0.3 | 10.9 | 1.7 | 15 | 3.6 | 60 | 150 | 47 | 25 | 6270.0 | 107.6 |
| 13 | 292 | 0.5 | 10.9 | 2.8 | 26 | 6.0 | 63 | 135 | 44 | 25 | 3762.0 | 64.6 |
| 14 | 200 | 1.1 | 16.3 | 2.5 | 15 | 5.4 | 60 | 143 | 64 | 17 | 1710.0 | 43.9 |
| 15 | 292 | 1.1 | 16.3 | 2.0 | 12 | 4.2 | 71 | 190 | 63 | 17 | 1710.0 | 43.9 |
| 16 | 292 | 1.1 | 21.8 | 1.7 | 8 | 3.7 | 68 | 192 | 76 | 13 | 1710.0 | 58.7 |
| 17 | 292 | 4.5 | 21.8 | 4.2 | 19 | 9.0 | 67 | 177 | 75 | 13 | 418.0 | 14.3 |
| 18 | 292 | 4.5 | 16.3 | 5.5 | 34 | 12.0 | 54 | 129 | 70 | 17 | 418.0 | 10.7 |
| 19 | 292 | 3.4 | 10.9 | 7.8 | 72 | 16.9 | 34 | 82 | 50 | 25 | 553.2 | 9.5 |
| 20 | 292 | 0.5 | 16.3 | 1.9 | 11 | 4.0 | 62 | 159 | 58 | 17 | 3762.0 | 96.6 |
| 21 | 292 | 0.3 | 2.3 | 1.1 | 49 | 2.4 | 65 | 152 | 20 | 120 | 6270.0 | 22.7 |
| 22 | 150 | 0.3 | 2.3 | 2.0 | 90 | 4.4 | 53 | 124 | 23 | 120 | 6270.0 | 22.7 |

In Examples 23 and 24 the following test procedures were used in evaluating the analytical properties of the polypropylene functionalized in accordance with the present invention.

1. Acid Number—acid number was determined in accordance with ASTM D1386-83 with the following modifications: a 0.05 N sodium hydroxide (NaOH) in methanol solution was substituted for the 0.1 N aqueous solution of potassium hydroxide in ethanol and the sample size was increased from 1-2 grams to 5 grams, and the weighing accuracy was changed from 0.001 to 0.0001 grams.

2. Color—pellet color was measured as "yellowness index" in accordance with ASTM D1925 using a standard Gardner BYK Color-View™ laboratory instrument.

3. Viscosity, expressed in centipoise (cP), was determined in accordance with ASTM D-3236 utilizing a Brookfield Model RVDV-II+digital Viscometer with a SC 4-27 spindle and a Brookfield Model 74R Temperature Controller set to 190° C., with the following exceptions:

a. viscosity was recorded 20 minutes after beginning spindle rotation in the sample;

b. only single measurements were taken for each sample; and c. the rotational speed was 3 rpm.

4. The molecular weights were measured using a Polymer Labs gel permeation chromatography GPC 210 Plus with three each 10 micron mixed B columns. The polymer was dissolved in trichlorobenzene using a 1 ml/min flowrate at a temperature of 135° C. The instrument was calibrated using an American Polymer Standards Corporation PP-105K polypropylene with a broad standard.

The feed materials used in Examples 23 and 24 were:

1. A nominal 1 Melt Flow Rate (MFR) polypropylene homopolymer available from Huntsman under the trade name Huntsman P4-G2Z-026.

2. Maleic anhydride briquettes available from Huntsman were melted at 130° F. and fed as a molten stream into the extruder as described below.

3. Lupersol 101 peroxide, (2,5-dimethyl-2,5-bis-(t-butylperoxy)hexane), was used as an initiator.

Broadly, the following procedure was used to produce the functionalized polypropylenes: solid pellets of the nominal 1 melt flow rate Huntsman homopolymer polypropylene were fed at a rate of 1316 pounds/hour into a Century™ brand 92 mm×11 barrels long twin-screw co-rotating extruder and melted. Molten maleic anhydride at 25 pounds per hour and a temperature of 130° F. was introduced into the extruder and mixed with the melted polypropylene to form a melt blend. The free radical initiator, Lupersol 101, was introduced and mixed with the melt blend at a rate of 4.68 pounds/hour. The resultant mixture was mixed in the extruder for a time sufficient to form the desired functionalized polypropylene. Desirably, the functionalized polypropylene is subjected to a vacuum vented port during extrusion to remove volatile materials from the melt mixture. The functionalized polypropylene was then forced through a die, cooled using a standard cold water stranding bath, chopped and recovered.

Example 23

The homopolymer polypropylene was fed to Barrel 1 of an 11 barrel Century™ brand co-rotating twin screw extruder using a standard K-Tron loss-in-weight pellet feeder system. Molten maleic anhydride was pumped through a spring loaded injector into Barrel 3, port 1, at 130° F. using a high pressure pump and heated lines. Lupersol 101 peroxide was pumped through a spring loaded injector into Barrel 6, port 1 using a high pressure injection pump. Barrel 1 was set at a temperature of 200° F., and Barrels 2 through 11 were set at 400° F. The extruder rpm was increased to 180 and held constant for the duration of the experiment. After the extruder barrels were at the designated temperature, the feeders were turned on and the extruder was started up using methods known to those skilled in the extruder art of slowly increasing the rpm and feeds to target levels to prevent high torque shutdown of the extruder. Target rates for the feeds were as described above.

The extruder screw profile was set up using standard screw elements arranged to convey the homopolymer polypropylene feed forward from the feed port at Barrel 1 and force it through a set of kneading blocks designed to melt the polypropylene in a first melting zone. After the polypropylene was melted, the molten maleic anhydride was then injected into the already molten polypropylene and the two materials were mixed in a first mixing zone to form a blend. This first mixing zone was located down stream from the first melting zone of the extruder and was comprised of distributive mixing elements followed by melt sealing elements. The peroxide initiator, Lupersol 101, was injected into the extruder and mixed with molten blend of polypropylene and maleic anhydride in a second mixing zone to form a reaction mixture. This second mixing zone was comprised of distributive mixing elements followed by melt sealing elements for mixing the reaction mixture for a sufficient time to produce the desired maleic grafted polypropylene.

The amount of time the reaction mixture remains in the extruder is a function of the feed rates of the reactants, extruder size, screw design and rpm of operation can be optimized by those skilled in the art using routine experimentation. While in the extruder, the reaction-mixture was subjected to a vacuum to remove volatile materials, followed by recovery of the maleic grafted polypropylene using a standard strand bath and strand pelletizer. The cylindrical shaped pellets were captured after screening to separate both longs and fines using a standard vibrating screener.

The grafted polypropylene had an acid number=8, a Brookfield viscosity=79,000 centipoise, a Yellowness Index=36.5, and number average molecular weight Mn=29,561.

Example 24

In Example 24, the method of making the grafted polypropylene in accordance with the present invention was generally the same as Example 23 except for the following changes: the molten maleic feed rate was increased from 25 to 26.5 pounds/hour and the peroxide feed rate was reduced from 4.68 to 4.3 pounds/hour.

The grafted polypropylene had an acid number=7.6, a Brookfield viscosity=180,000 centipoise, a Yellowness Index=41.9, and number average molecular weight Mn=32,230.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

We claim:

1. A process for making a maleated polypropylene having an acid number greater than 6, a yellowness index of no greater than 76, and a number average molecular weight of at least 20,000 comprising:
   a. forming a molten mixture of polypropylene and maleic anhydride,
   b. introducing a free radical initiator into said molten mixture to produce a maleated polypropylene product, and
   c. recovering the product,
   wherein the weight ratio of polypropylene to maleic anhydride is about 10 to 200, the molar ratio of polypropylene to free radical initiator is about 200 to 4,000, and the molar ratio of maleic anhydride to free radical initiator is about 1 to 70.

2. The process according to claim 1 wherein the weight ratio of polypropylene to maleic anhydride is about 25 to 60.

3. The process according to claim 1 wherein the molar ratio of polypropylene to free radical initiator is about 270 to 2,100.

4. The process according to claim 1 wherein the molar ratio of maleic anhydride to free radical initiator is about 3.5 to 15.

5. The process according to claim 1 wherein the melt flow rate of said polypropylene in (a) is about 0.1 to 50 at 230° C.

6. The process according to claim 5 wherein the melt flow rate of the polypropylene is about 0.1 to 20 at 230° C.

7. The process according to claim 1 wherein said reactor is a screw extruder.

8. The process according to claim 1 wherein said free radical initiator is a peroxide having a half life greater than 3 seconds at 180° C.

9. The process according to claim 8 wherein said peroxide is selected from the group consisting of ditertiary butyl peroxide, tertiary butyl hydroperoxide, cumene hydroperoxide, p-menthane peroxide, p-menthane hydroperoxide and 2,5-dimethyl-2,5-bis-(t-butylperoxy) hexane.

10. The process according to claim 1 wherein step (b) is conducted at a temperature between 190 and 205° C.

11. The process according to claim 1 wherein the reaction proceeds at an efficiency rate of greater than 35 percent maleic anhydride incorporation into polypropylene.

12. The process according to claim 1 wherein the efficiency rate is at least 49 percent maleic anhydride incorporation into polypropylene.

* * * * *